(12) United States Patent
Penta

(10) Patent No.: US 6,415,711 B1
(45) Date of Patent: Jul. 9, 2002

(54) CHEESE SHREDDER APPARATUS

(76) Inventor: Angelo Penta, 29 Timberlea Trail, Kirkland, Quebec (CA), H9J 2Y3

( * ) Notice: Subject to any disclaimer, the term of this patent is extended or adjusted under 35 U.S.C. 154(b) by 0 days.

(21) Appl. No.: 09/562,538

(22) Filed: May 2, 2000

(51) Int. Cl.$^7$ ................................. A47J 43/25
(52) U.S. Cl. ............... 99/465; 99/466; 99/537; 83/437.3; 83/734; 83/592; 83/932; 100/269.01; 241/88.4; 241/92; 241/273.2; 241/285.1; 254/93 R
(58) Field of Search .................... 99/460, 465, 466, 99/537; 241/24, 26, 85, 88.4, 91–93, 273.2, 282.2, 277, 285.1; 254/93 R; 100/269.01; 425/308; 83/865, 356.3, 425.1, 435.16, 437.2, 592, 932, 437.3, 734

(56) References Cited

U.S. PATENT DOCUMENTS

| | | | |
|---|---|---|---|
| 1,668,286 A | * 5/1928 | Powell | |
| 2,489,504 A | 11/1949 | Schlude | 31/26 |
| 3,571,929 A | 3/1971 | Peters | 31/48 |
| 3,610,304 A | 10/1971 | Popeil et al. | 146/113 B |
| 3,776,073 A | 12/1973 | Runge | 83/47 |
| 3,831,866 A | * 8/1974 | Phillips | 241/63 |
| 3,888,428 A | * 6/1975 | Tabernacki | 241/92 |
| 4,111,087 A | 9/1978 | Pankratz et al. | 83/210 |
| 4,318,321 A | 3/1982 | De Mattos | 83/71 |
| 4,620,838 A | 11/1986 | Miller et al. | 429/135 |
| 4,646,602 A | 3/1987 | Bleick | 83/408 |
| 5,792,497 A | 8/1998 | Abler et al. | 426/516 |
| 5,893,825 A | 4/1999 | Rebeaud | 493/468 |
| 5,983,769 A | * 11/1999 | Schneider | 83/865 |

* cited by examiner

*Primary Examiner*—Keith Hendricks
*Assistant Examiner*—Drew Becker
(74) *Attorney, Agent, or Firm*—Duane Morris LLP

(57) ABSTRACT

Improvements are provided in an apparatus and a method for shredding blocks of cheese. The apparatus includes an elongated cheese chamber having an open side face for the admission of a block of cheese, which is urged into the elongated cheese chamber by a loading piston, a longitudinally-extending side plate and a floor surface for slidingly-engaging a block of cheese. An extruding piston is provided to force the cheese downstream within the elongated cheese chamber. The improvement includes an extrusion grid plate which is fixed at the downstream end of the elongated cheese chamber having a plurality of elongated, parallel, horizontal and vertical, knife-edges constituting a plurality of rectangular openings. A rotatable shredder assembly including an overlapped disc is sited immediately downstream of, and is in longitudinal abutment with, the extrusion grid plate, to prevent undesired escape of the extruded cheese. The shredder assembly shreds each of extrusions to divide each of the extrusion into a plurality of discrete shreds.

9 Claims, 8 Drawing Sheets

CHEESE SHREDDER APPARATUS

BACKGROUND OF THE INVENTION (i) Field of the Invention

The present invention relates generally to an apparatus for providing shreds of cheese, and more particularly to the use of extrusion apparatus for forming a plurality of shreds of cheese of predetermined size.

(ii) Description of the Prior Art

Shredded cheese, or cheese in the form of elongated shreds or other shapes, is used in the preparation of various types of food, e.g., pizza. It is generally preferable for certain markets that the shreds be of approximately uniform size and weight, and be on the order of one inch in length.

Cheese is generally manufactured in relatively large blocks and is cut for sale into smaller blocks or chunks of shapes and sizes selected according to consumer preference. In the past, attempts to produce shredded cheese by extrusion have not been entirely successful. One problem has been that variation in the rate of extrusion across the width of an extrusion die has caused lack of uniformity among the shreds. Another problem has been that working of the cheese during extrusion has caused maceration and oiling off. "Maceration" is a softening of the texture of the cheese due to a breakdown of the cheese structure. "Oiling off" is a separation of oil from the other constituents of the cheese. Both are undesirable and inhibit the formation of desired shreds.

One patent which purported to solve this problem was U.S. Pat. No. 4,620,838, patented Nov. 4, 1986, by R. E. Miller et al. and assigned to Kraft, Inc. That patent provided an extrusion apparatus for forming a quantity of cheese into a plurality of approximately uniformly shaped pieces, e.g., relatively small shreds of predetermined configuration without substantial damage to the cheese due to working and pressure. The apparatus included one or more chambers for holding the cheese, the chamber having smooth longitudinal interior surfaces for slidably-engaging the cheese. At the downstream end of each chamber was a perforated area of a die plate. A ram was provided to force the cheese downstream of its chamber through the perforations or openings in the die plate to form a plurality of extrusions of predetermined cross section. A vertically-oscillatable cutter assembly was positioned downstream of the die plate adjacent thereto to cut through the extrusions at a predetermined frequency as they emerged from the openings in the die plate. This action divided each extrusion into a plurality of discrete segments, each having a predetermined dimension in the direction of extrusion.

Another patent was U.S. Pat. No. 4,111,087, patented Sep. 5, 1978, by R. R. Pankrantz et al. Although that patent was directed to a cheese packaging apparatus, it also included a cheese cutter which would only commence operation when a loaf, or a stacked layer of cheese, was properly located at the intake position of the cheese cutter. The cheese cutter was fed standard loaves of cheese by a conveyor which comprised of rotatable, but translationally-stationary, rollers. The cutter included a scalloped ram which laterally moved the cheese across the rollers through a vertical harp on to a platform. The platform was an elevator, which in its lowered position, formed a portion of an automatic wrapping machine. The scalloped ram had vertical grooves in it which received the vertical wires of the cutting harp. Engagement and disengagement of the harp wires by the grooves removed any excess cheese particles from the harp.

Still another patent was U.S. Pat. No. 4,318,321, patented Mar. 9, 1982, by D. N. DeMattes and assigned to Codal Management Limited. That patent provided apparatus for cutting a block of a soft, non-granular substance into a plurality of portions. The apparatus included a platen to receive a block to be cut. A drive was provided for advancing the platen from a starting position, in steps, to a fully-advanced position. A first cutter was provided for cutting into the block along the direction of advance of the block on the platen. A second cutter was provided for cutting the block in a direction transverse to the cuts which were produced by the first cutter. Operation of both the first cutter and the second cutter produced a layer of portions cut from the block. The drive was adjustable to set the size of steps in which the platen advanced, and thus controlled the thickness of the layer of portions produced. The block was divided completely into a plurality of layers, none of which had a thickness less than a predetermined minimum.

Yet still another patent was U.S. Pat. No. 4,782,729, patented Nov. 8, 1988, by E. R. Mathot. Although relating to an animal fibre cutting machine, this patent included features which could be applied to the shredding of cheese. The patentee provided an apparatus which included a frame. The frame included slicers which were carried by the frame to rotate for slicing the material into elongated strands which were fed along parallel paths of widths determined by spacing of the slicers. Rotary cutters were carried by the frame to rotate and intercept the strands which were fed along the paths, and for also cutting the strands crosswise thereof and at intervals which were predetermined by rotary spacing of the cutters. This formed the pieces having predetermined sizes. The slicer comprised an elongated shaft, with the slicer comprising a plurality of parallel slicer discs which were spaced apart along the length of the shaft. The cutter comprised an elongated shaft carrying the cutters which were spaced-apart circumferentially of the shaft. The slicer shaft, and the cutter shaft had generally-parallel axes of rotation. Further, the cutters typically extended helically along, and about, an axis which was defined by the cutter shaft, and were spaced below the level of the slicer means shaft, the two shafts extending generally-horizontally. A back-up roller was spaced from, and was parallel to, the cutter shaft so that tips which were defined by the helical cutters intercepted a cylinder which was defined by the outer surfaces of the back-up roller. The back-up roller typically had grooves that received the cutter tips as the roller and cutter shaft rotated. The back-up roller included gearing which was operatively-connected with the roller and cutter shafts to control synchronized rotation thereof. Also, a slot-roller was employed to have slots which were positioned to receive outer portions of the slicer discs as the discs were rotated, and also having peripheral teeth to engage and drive the strands.

SUMMARY OF THE INVENTION

Aims of the Invention

In spite of these alleged improvements in apparatus for shredding cheese, problems still remained. One of the major problems was that some of the extruded cheese tended to fall below the extruder before the slicer could slice the extruded cheese, thereby not only wasting cheese, but also degrading the quality of the subsequently-shredded cheese.

Accordingly, one object of this invention is provide an improvement in an apparatus for the shredding of cheese.

A second object of this invention is to provide such an improvement wherein the shredder assembly may easily and rigidly be exchanged.

Statements of the Invention

By this invention, a first improvement is provided in an apparatus for forming a block of cheese into a plurality of relatively small shreds. The apparatus includes an elongated cheese chamber having longitudinally-extending side and floor surfaces for slidingly-engaging the block of cheese, an extrusion grid plate at the downstream end of the elongated cheese chamber, and ram means for forcing the block of cheese in a downstream direction at a predetermined speed through the extrusion grid plate. The improvement comprises a rotatable shredder assembly sited immediately downstream of, and in longitudinal abutment with, the extrusion grid plate, to prevent undesired escape of extruded cheese to shred each of the extruded cheese as it emerges from the extrusion grid plate to divide the extruded cheese into a plurality of discrete shreds.

By this invention, a second improvement is provided in an apparatus for forming a block of cheese into a plurality of relatively small shreds. The apparatus includes an elongated cheese chamber having longitudinally-extending side and floor surfaces for slidingly-engaging the block of cheese, an extrusion grid plate at the downstream end of the elongated cheese chamber, and ram means for forcing the block of cheese in a downstream direction at a predetermined speed through the extrusion grid plate. The improvement comprises both a rotatable shredder assembly sited immediately downstream of, and in longitudinal abutment with, the extrusion grid plate, to prevent undesired escape of extruded cheese to shred each of the extruded cheese as it emerges from the extrusion grid plate to divide the extruded cheese into a plurality of discrete shreds, and having the ram means comprise a hydraulic/pneumatic cylinder, including an upstream air chamber and a downstream hydraulic chamber, which are divided by a piston having a downstream extending piston rod connected to a cheese pusher plate assembly, and a connection from a source of air under pressure to the air chamber to initiate a power stroke, a hydraulic connection between the hydraulic chamber and a hydraulic reservoir, and a source of air under pressure to the hydraulic reservoir to initiate a return stroke.

By this invention, a third improvement is provided in an apparatus for forming a block of cheese into a plurality of relatively small shreds. The apparatus includes an elongated cheese chamber having longitudinally-extending side and floor surfaces for slidingly-engaging the block of cheese, an extrusion grid plate at the downstream end of the elongated cheese chamber, and ram means for forcing the block of cheese in a downstream direction at a predetermined speed through the extrusion grid plate. The improvement consists in the ram means comprising a hydraulic/pneumatic cylinder, including an upstream air chamber and a downstream hydraulic chamber, which is divided by a piston having a downstream extending piston rod connected to a cheese pusher plate assembly, a pneumatic connection from a source of air under pressure to the air chamber to initiate a power stroke, a hydraulic connection between the hydraulic chamber and a hydraulic reservoir, and pneumatic connection to a source of air under pressure to the hydraulic reservoir to initiate a return stroke.

By a fourth improvement of this invention, a method is provided for forming a block of cheese into a plurality of relatively small shreds of cheese. The method includes transporting a block of cheese in a downstream longitudinal direction to a predetermined, first zone. The block of cheese is urged in a perpendicular direction through the first zone into a longitudinally-extending extrusion zone. The block of cheese is extruded in a downstream direction through the longitudinally-extending zone and through a fragmentation zone. The fragmented cheese is received immediately from the fragmentation zone and, substantially-continuously thereafter, is passed through a shredding zone having a rotating shredder while substantially-simultaneously inhibiting escape of the fragmented cheese which passes through the shredding zone. The shredded cheese from the shredding zone is then recovered. The above steps are then repeated in an intermittent/continuous manner.

Other Features of the Invention

By a first feature of the first and second improvements of this invention, the rotatable cutter assembly includes a shredder disc support wheel, and a shredder disc which is removably, but firmly, secured to the shredder disc support wheel. By one further feature thereof, the shredder disc support wheel includes a plurality of circumferentially-spaced-apart tabs which project downwardly from the periphery thereof, and the shredder disc includes a plurality of flat circumferential areas which are adapted to be locked behind the tabs by rotation of the shredder disc until the flat circumferential areas are locked behind the tabs. By a second further feature thereof, the elongated cheese chamber which is downstream of the extrusion grid plate includes longitudinally-extending flanges, and the shredder disc support wheel is locked behind the longitudinally-extending flanges, thereby to prevent undesirable escape of the plurality of extrusions.

By a second feature of the first and second improvements of this invention, the extrusion grid plate defines a plurality of parallel, horizontal and parallel vertical knife edges constituting a plurality of rectangular parallel openings.

By a first feature of the second and third improvements of this invention, the hydraulic reservoir includes a one-way check-valved air outlet.

By a second feature of the second and third improvements of this invention, the hydraulic connection between the hydraulic chamber and the hydraulic reservoir comprises a two way hydraulic line to, and from, the hydraulic reservoir, that hydraulic connection being provided with a manually-controllable flow valve, and a one-way-check-valved hydraulic line from the hydraulic reservoir.

By a third feature of the first, the second and the third improvements of this invention, the apparatus includes a primary belt conveyor system to convey the block of cheese to an open side face of the cheese chamber, and a stop device to stop the block of cheese at the open side face of the cheese chamber.

By a first feature of this fourth improvement of this invention, the transporting step comprises transporting the block of cheese on an endless belt conveyor. By one feature thereof, the method includes the additional step of automatically and temporarily stopping the movement of the block of cheese by engaging the block of cheese against a suitable switch means.

By a second feature of this fourth improvement of this invention, the urging step comprises urging the block of cheese by applying hydraulic pressure to the block of cheese by a hydraulic cylinder.

By a third feature of this fourth improvement of this invention, the urging step is preceded by first sensing the absence of a block of cheese within the extrusion zone.

By a fourth feature of this fourth improvement of this invention, the extruding step comprises extruding the block of cheese through the extrusion zone by the steps of providing a cylinder with a pneumatic zone and a hydraulic zone which is separated by a longitudinally-movable piston; providing a connection between air under pressure and the pneumatic zone; providing an outflow connection from the hydraulic zone to an hydraulic reservoir zone, and providing an air flow connection from the hydraulic reservoir to the hydraulic zone, initiating a power stroke of the longitudinally-movable piston by introducing air under pressure into the pneumatic zone while simultaneously urging hydraulic fluid from the hydraulic zone to the hydraulic reservoir zone; and initiating a return stroke of the longitudinally-movable piston by introducing air under pressure into the hydraulic reservoir zone while simultaneously urging hydraulic fluid into the hydraulic zone.

DESCRIPTION OF PREFERRED EMBODIMENTS

DESCRIPTION OF FIG. 1, FIG. 2 AND FIG. 3

Figure 1:
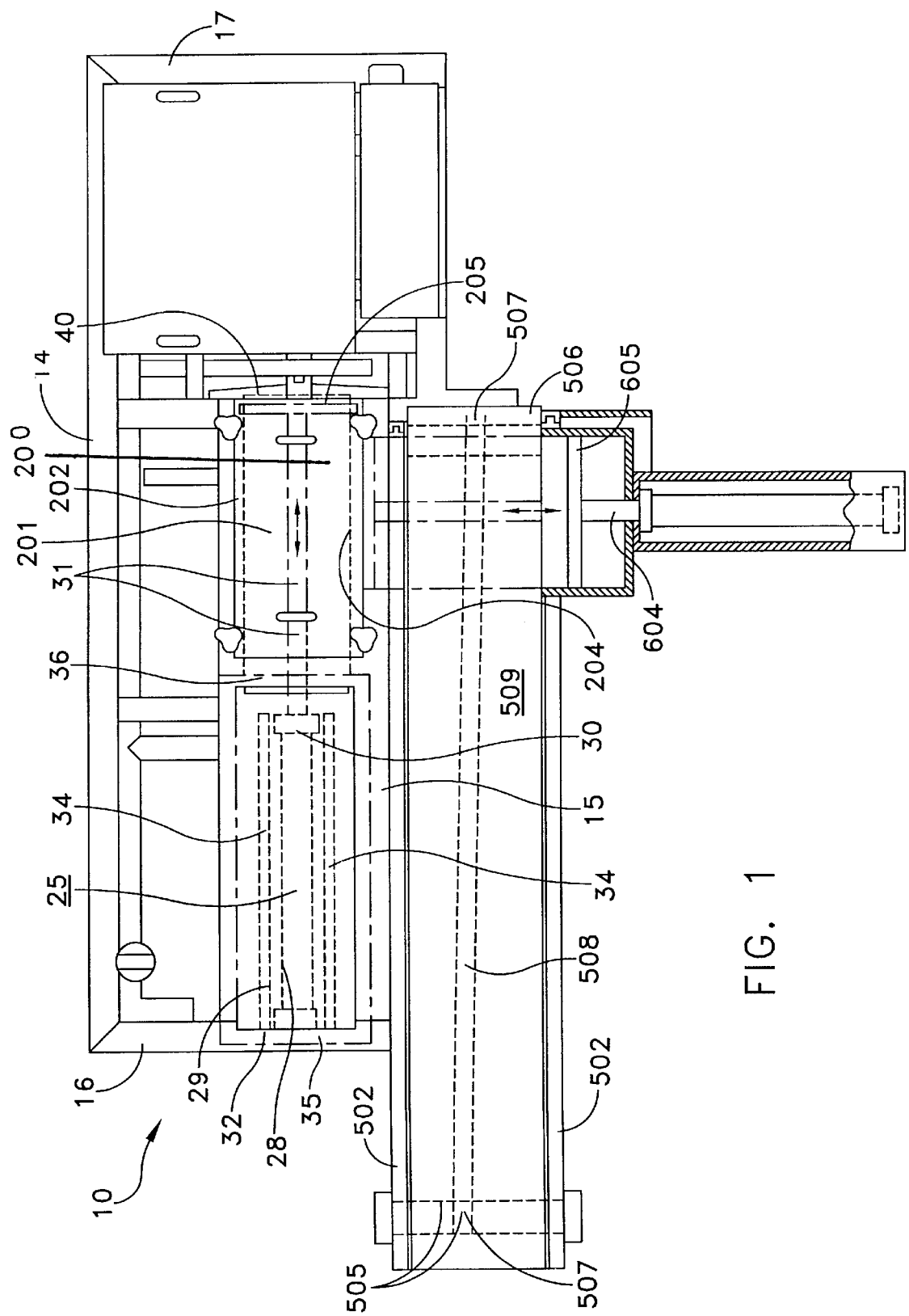
FIG. 1 is a top plan view (partially broken away) of one embodiment of the present invention.
Figure 2:
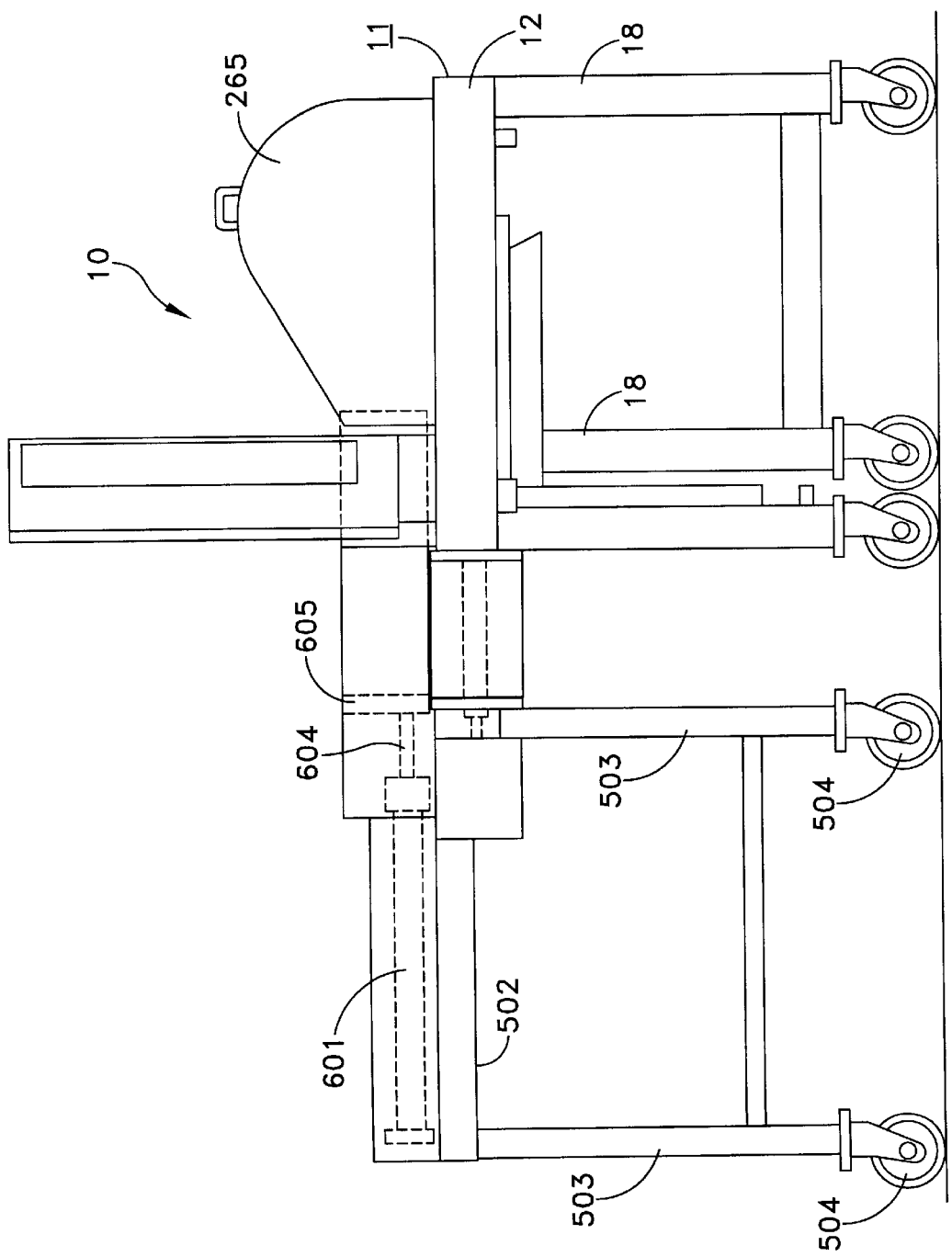
FIG. 2 is a side elevational view of the embodiment of the present invention of FIG. 1.
Figure 3:
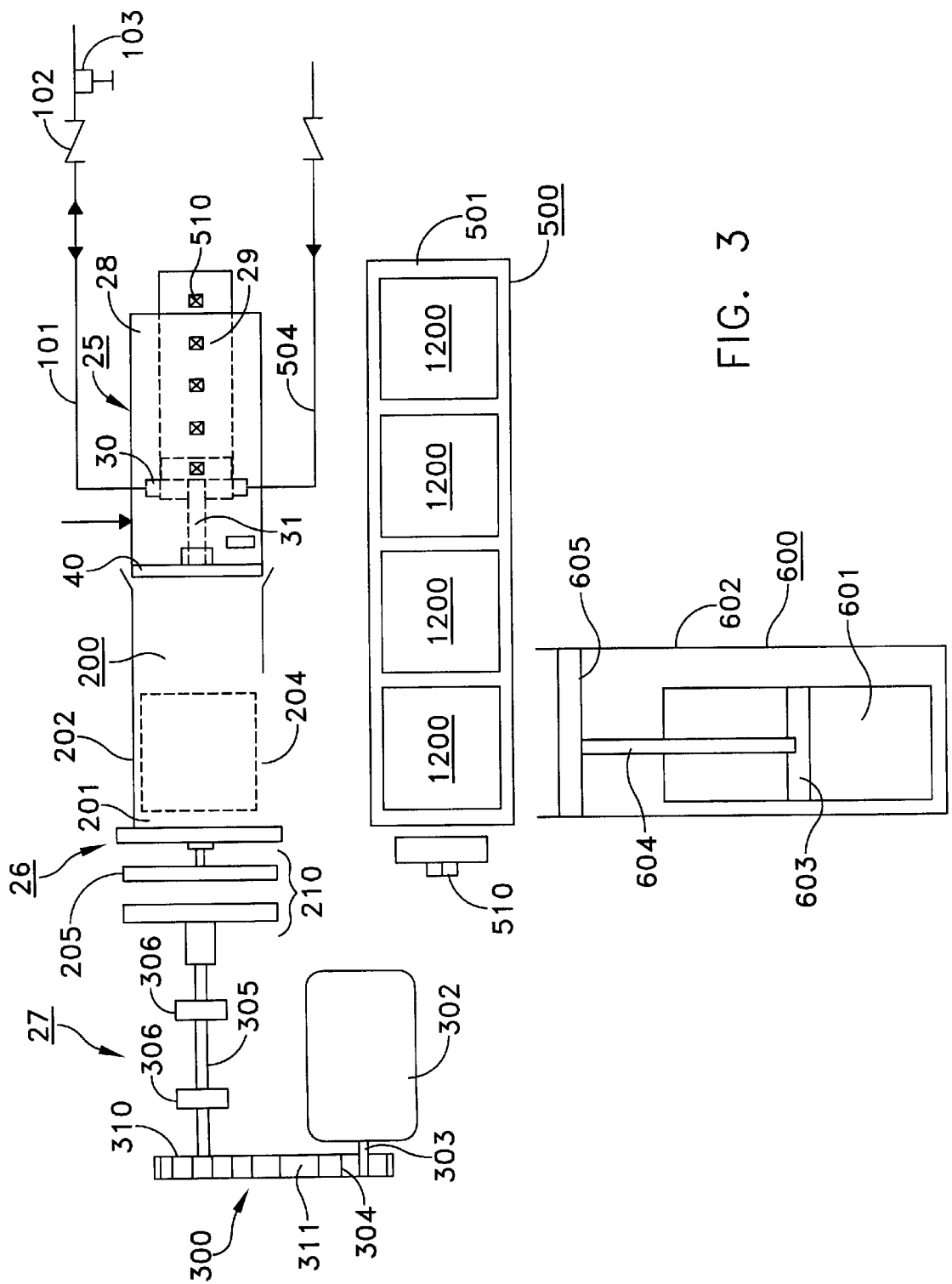
FIG. 3 is a schematic plan view of the embodiment of the invention, intended also to show the sequence of operations.
Figure 13:
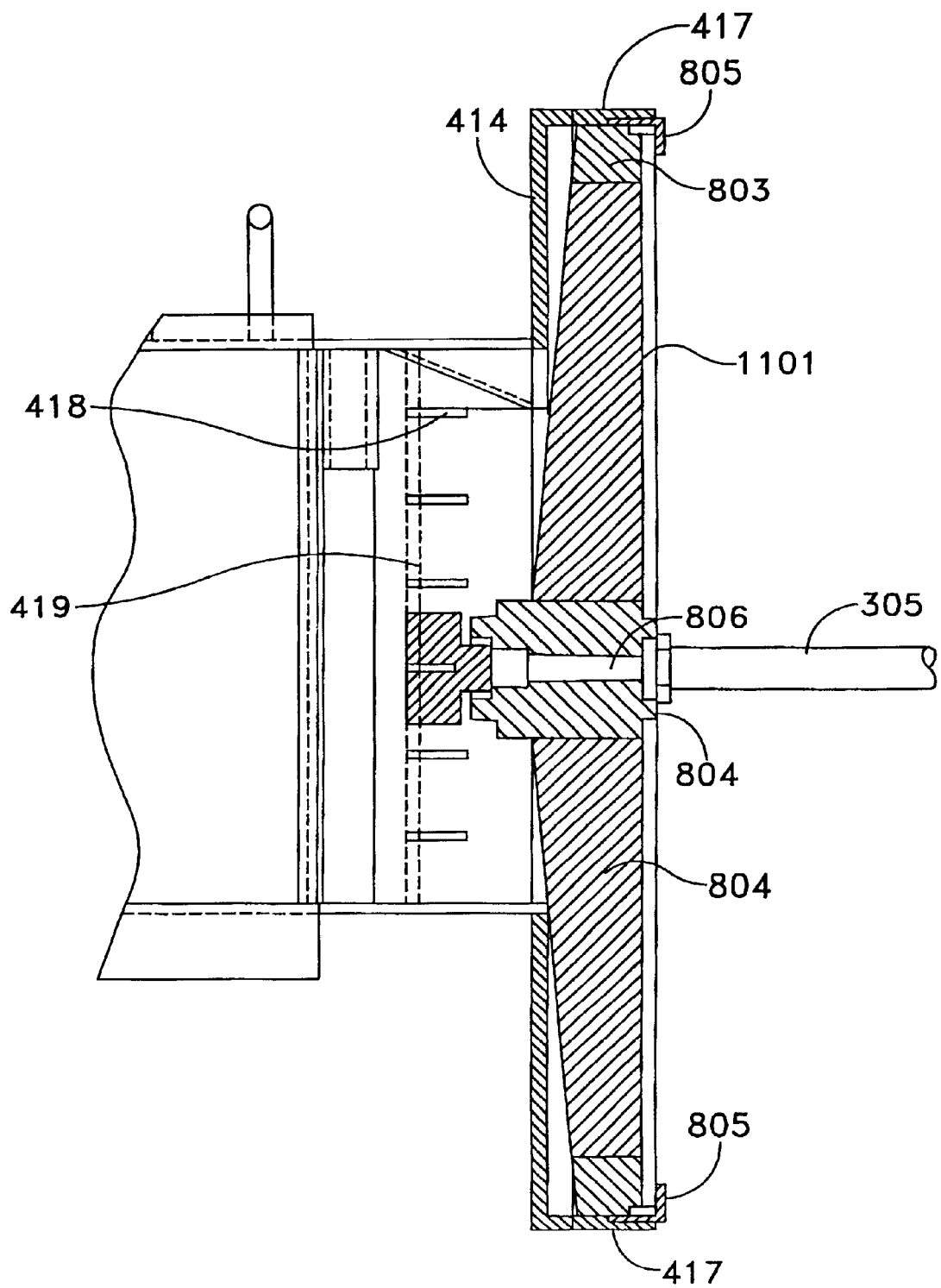
FIG. 13 is a view, partly in section, showing a composite of parts from FIGS. 3, 5, 6 and 11.

As seen in FIG. 1, FIG. 2 and FIG. 3, the present invention in one embodiment thereof is generally embodied in a cheese extrusion apparatus 10, for forming a mass of cheese into a plurality of approximately-uniform, relatively-small pieces or shreds of predetermined configuration. See also the composite view of FIG. 13.

The cheese shredder 10 includes a primary frame 11 which is provided by a sturdy base table 12, i.e., of two longitudinally-extending beams 14, 15, and two transversely-extending beams 16, 17, and which is supported on legs 18. This provides an open lattice framework for the cheese shredder assembly 24 of an embodiment of this invention. The legs 18, are each fitted either with fixed wheels of, e.g., 6" diameter, or with swivel wheels of, e.g., 6" diameter.

The cheese shredder assembly 24 which is secured to such primary frame sturdy base table 12, includes three sub-assemblies 25, 26, 27.

Figure 4:
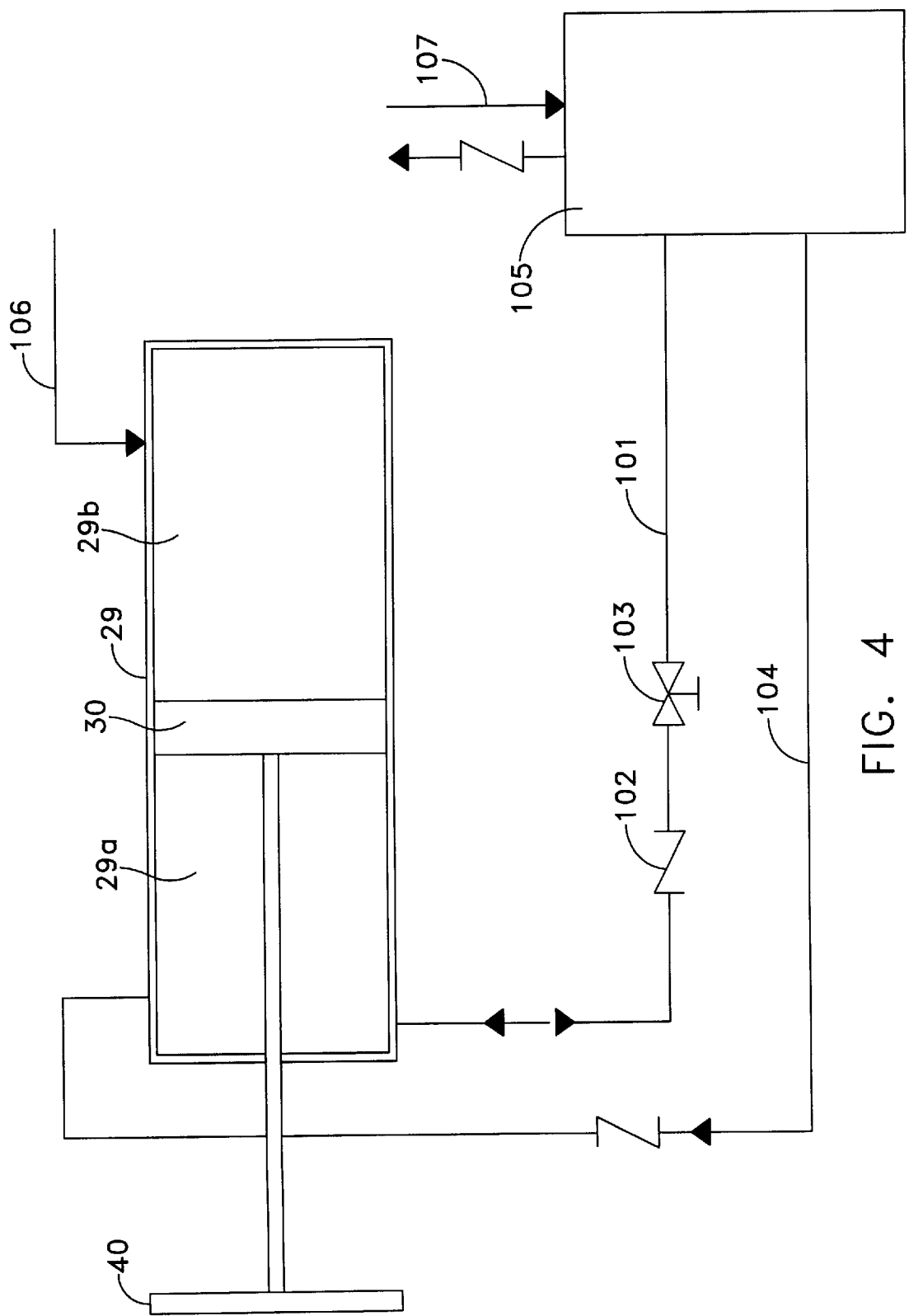
FIG. 4 is a schematic flow chart of one embodiment of the hydraulic/pneumatic system used in the present invention.

The first sub-assembly 25 is a primary ram assembly 28. The primary ram assembly 28 comprises a pneumatic/hydraulic cylinder 29 (which will be described further with respect to FIG. 4) having an internal piston 30 within the cylinder 29 and a free rod end 31 which is attached to the piston 30. The cylinder 29 is enclosed within a rectangular box 32 including two side walls 34, 35 and an apertured downstream end wall 36. The free rod end 31 includes a removably-attached, vertically-oriented cheese pusher plate assembly 40. The vertically-oriented cheese pusher plate assembly 40 is adapted to be urged into the interior of an elongated cheese chamber 200 (as will be described hereinafter).

The pneumatic/hydraulic cylinder 29 is provided with an hydraulic fluid (oil) inlet/outlet line 101, which is provided with a manual control valve 103 and a check valve 102, to connect a hydraulic fluid (oil) reservoir 105, which is suitably disposed in conjunction with legs 18, with the cylinder 29 forwardly of the piston 30 and with an inlet line 104. During the power stroke hydraulic fluid (oil) is discharged from the cylinder 29 to the reservoir 105 via line 101. During the return stroke, hydraulic fluid (oil) is fed to the cylinder 29 via lines 101,104. The power stroke is initiated by air under pressure being fed to the cylinder 29 via air line 106. The return stroke is initiated by air under pressure being fed to hydraulic reservoir 105 via air line 107. The air under pressure is, e.g., about 100 psig.

The primary hydraulic/pneumatic cylinder 29 is mounted, as mentioned hereinabove, within rectangular box 32, which is mounted atop the rearward end of the sturdy base table 12. In addition, a cover 53 is hingedly secured to the rear end of the sturdy base table 12.

The second sub-assembly 26 consists of the elongated cheese chamber assembly 200 which is secured to the sturdy base table 12 downstream of the pusher plate assembly 40.

As shown, the cheese chamber assembly 200 includes a cheese chamber 201 is provided for holding the mass of cheese prior to forming the cheese into shreds. The interior of each chamber 201 is defined by a longitudinal side surface 202 and a bottom floor for slidably engaging the mass of cheese which has been urged into the cheese chamber 201 through its open side area 204. At the downstream end of chamber 201 is an extrusion grid plate 205 comprising a plurality of intersecting vertical and horizontal knife blades defining a plurality of stacked rectangular openings 206 (and which will be further described with reference to FIGS. 5 and 6). The previously-described cylinder 29 of the cylinder assembly 28 forces the mass of cheese forwardly downstream, within the chamber 201 through the stacked rectangular openings 206 in the extrusion grid plate 205 to form a plurality of elongated extrusions of rectangular cross-section. A shredder assembly 210 is positioned immediately downstream of the extrusion grid plate 205 and abuts the extrusion grid plate 205 to shred the extrusions immediately after they emerge from the openings 204 in the extrusion grid plate 205 and to divide each extrusion into a plurality of discrete shreds.

The cheese chamber 201 is of generally-rectangular cross section. Such cheese chamber 201 preferably is a generally-rectangular parallelepiped box, whose longitudinal length is greater than its transverse width.

DESCRIPTION OF FIGS. 5 TO 12

The shredder mechanism is shown in greater detail in FIG. 5 to FIG. 12.

Figure 5:
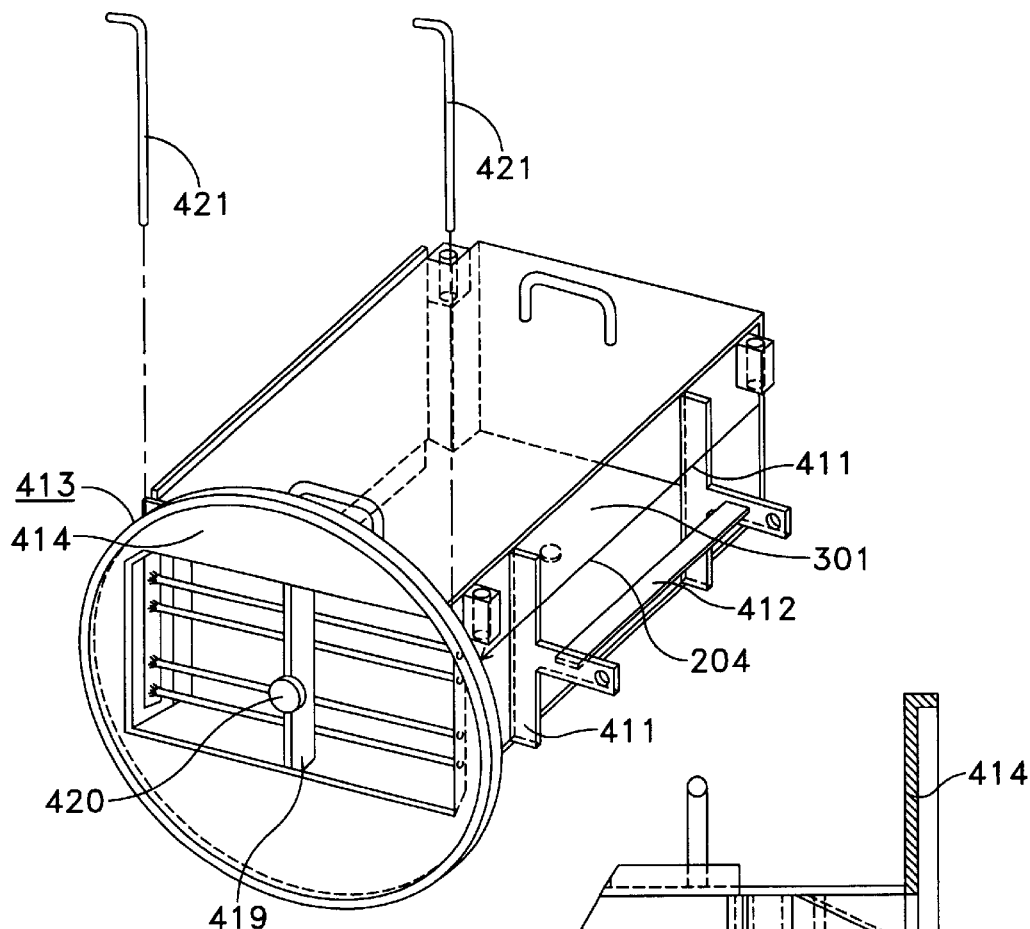
FIG. 5 is a perspective view of one embodiment of an elongated cheese chamber forming an essential element of this invention.
Figure 6:
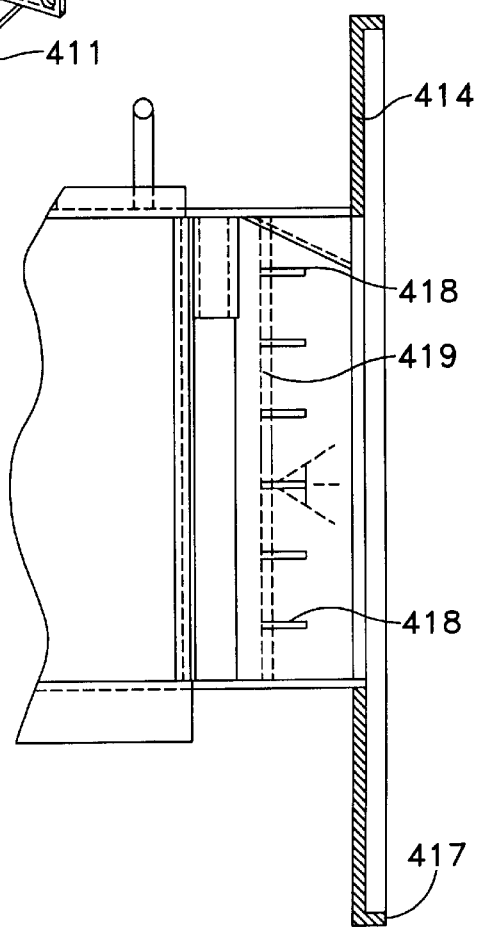
FIG. 6 is a partial side elevational view, partly in section, of the downstream end of the elongated cheese chamber of FIG. 5.
Figure 7:
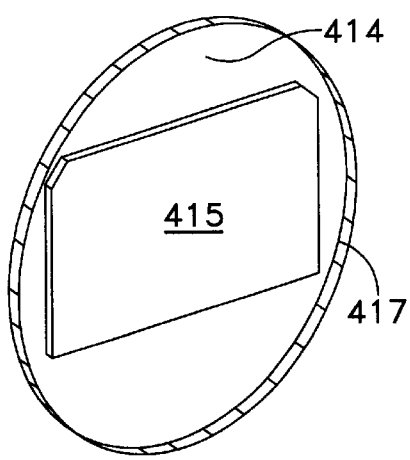
FIG. 7 is a perspective view of the downstream end wall of the elongated cheese chamber of FIG. 5.
Figure 8:
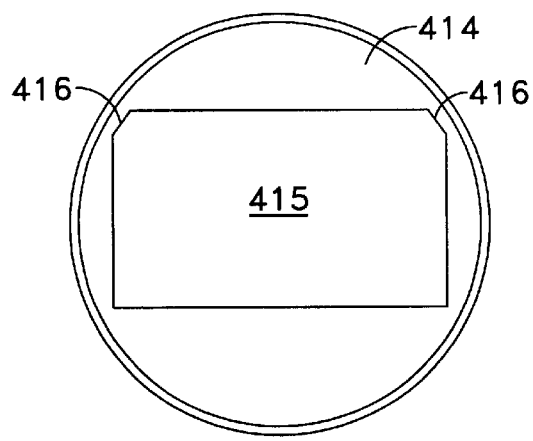
FIG. 8 is a front elevational view of the downstream end wall of the elongated cheese chamber of FIG. 5.

FIGS. 5 to 8 show further details of the extrusion grid plate 205. As seen in FIGS. 5 and 6, the elongated cheese chamber 201 includes a cheese-accessing open side 204, and the support framework for the secondary conveyor 600 to be described hereinafter. Such support framework consists of a pair of longitudinally-spaced-apart, vertically-oriented, "T"-shaped supports 411, at the open side 204, which are interconnected by a longitudinally-extending support bar 412.

The downstream end 413 of the elongated cheese chamber 201 includes an integral, vertically-oriented disc 414. Disc 414 includes a central open, generally-rectangular area 415, which has its two upper corners 416 cut-off. The disc 414 includes a projecting rim 417, whose purpose will be explained hereinafter. Open area 415 is fitted with a plurality, in this case six, horizontally-oriented knife edges 418, and with a single vertically-oriented knife-edge bar 419, having internally-facing knife edges. The frame supporting the knife edges is secured to the end of the elongated cheese chamber 301 by means of pins 421. Bar 419 includes a central hub assembly 420 by means of which a rotatable shredder assembly (to be described hereinafter) can be secured.

Figure 9:
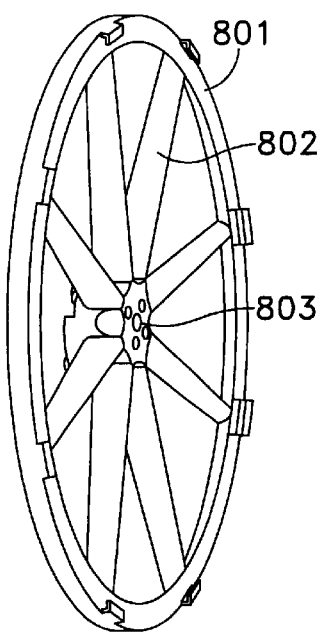
FIG. 9 is a perspective view of one embodiment of the shredder blade support forming an essential element of an aspect of the elongated cheese chamber of FIG. 5 which is an essential element of this invention.
Figure 10:
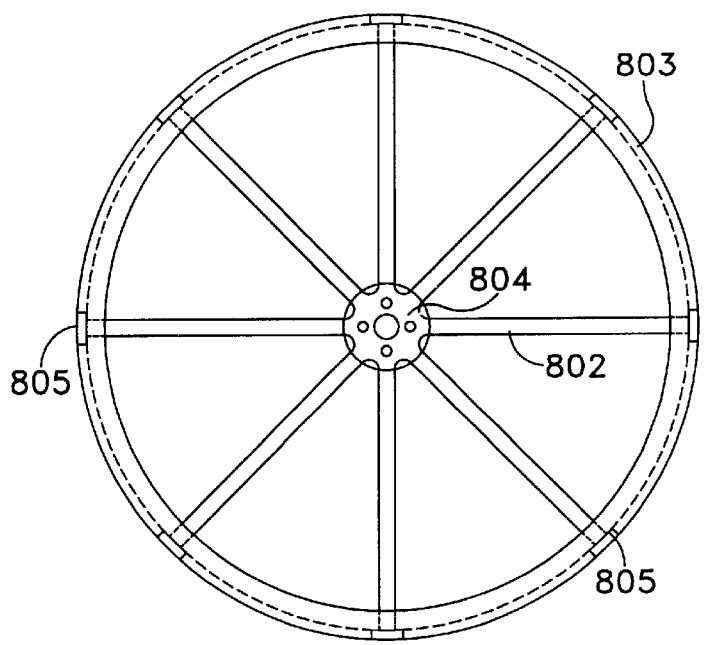
FIG. 10 is a front elevational view of the shredder blade support of FIG. 9.
Figure 11:
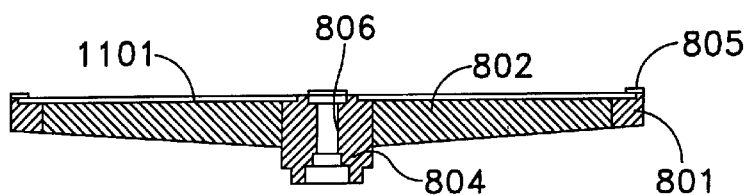
FIG. 11 is a central longitudinal cross-section of the shredder blade support of FIG. 9 and FIG. 10.

FIGS. 9, 10 and 11 show the rotatable shredder assembly 800 in greater detail. The rotatable shredder assembly 800 includes a wheel 801 connecting the rim 803 of the wheel 801 to a hub 804. The rim 803 is provided with a plurality, in this case eight, inwardly-extending downwardly projecting tabs 805. A hub 802 includes a central securing bolt mechanism 806, by means of which the rotatable shredder assembly 800 can be secured to the previously-described central hub assembly 420. There is an overlap of the disc 819 and the cheese chamber to leave a gap of no more than about 1/16" to avoid discharge of large blocks of cheese.

Figure 12:
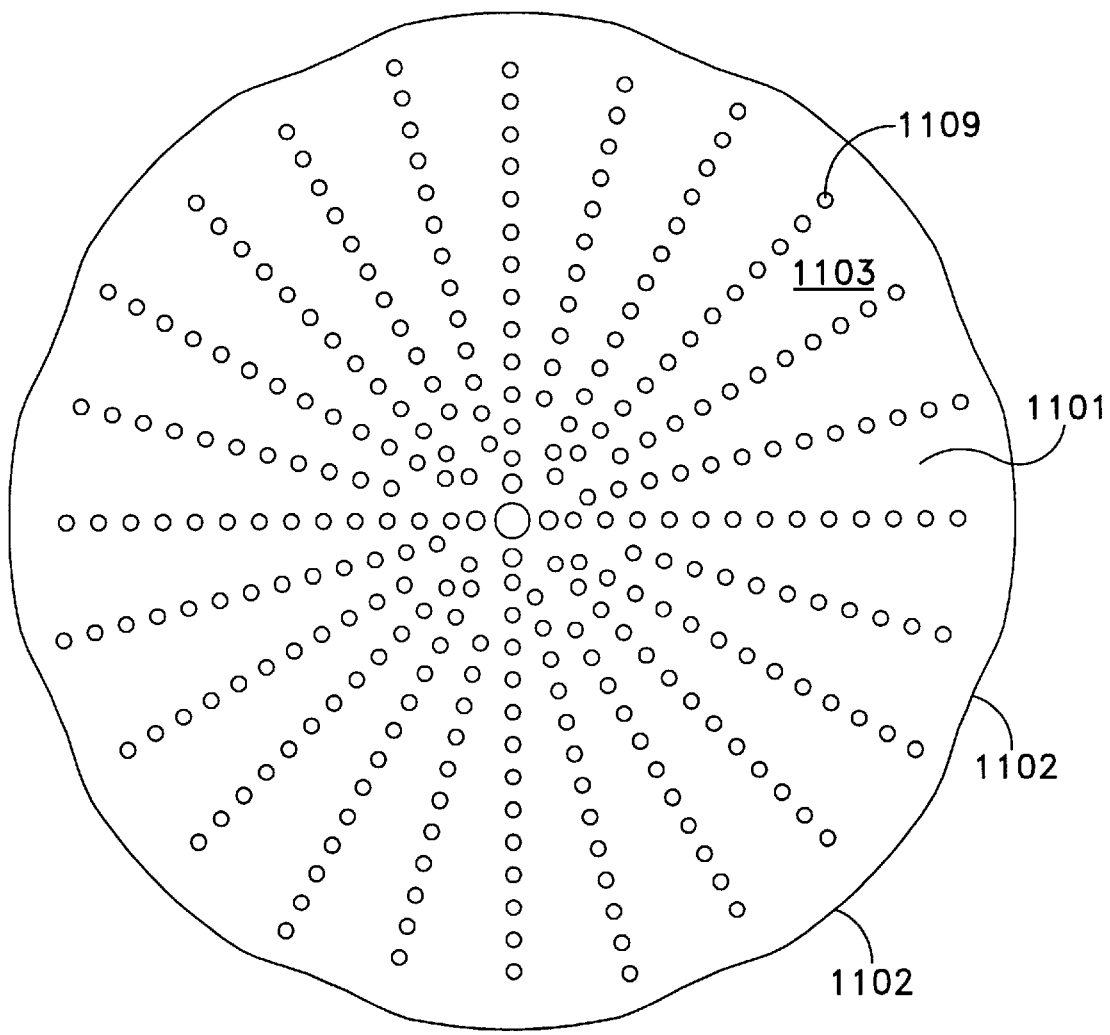
FIG. 12 is a front elevational view of one embodiment of a typical shredder blade forming an essential element of an aspect of this invention used in the apparatus of the present invention.

FIG. 12 shows one embodiment of a shredder wheel 1101. The shredder wheel 1101 is generally-disc-shaped, but includes a plurality, in this case eight, flattened portions 1102. Disposed on a prearranged pattern on the face 1103 are a plurality of teeth 1104. The teeth 1104 may be shaped to provide a feather cut of the cheese, generally ranging in size from 5/14" to 3/8"; or to provide a square cut, generally ranging in size from 5/14" to 1/2"; or to provide grated cheese, generally ranging in size from 5/14" to 3/8"; or to provide a square cut, generally ranging in size from 5/14" to 1/2"; or to provide grated cheese, generally ranging in size from 1/8" to 1/4". It is, of course, possible to provide custom shapes and sizes. It is also possible to provide a square type shred. The length of the shred can vary from 3/4" to the width of the cheese block.

The cheese shredder disc 1101 is secured to the wheel 801 by placing it against the wheel 801 and rotating the cheese shredder disc 1101, so that the flattened portions 1102 are locked behind the projecting tabs 805. The rotatable shredder assembly 800 is then secured to the disc 414 by suitable means extending between the hub 804 and the central hub assembly 420. A driven shaft 305 is connected to the rotatable shredder assembly 800.

In the extrusion grid plate 205, the configuration of the knife-edge openings 206 and the spacing therebetween have been selected to provide enough resistance to the passage of cheese through the extrusion grid plate 205 to enable pressure to be maintained within the chamber 201 without creating excessive. pressure on the cheese or causing excessive working of the cheese. The stacked, rectangular knife-edge openings 206 defining the open areas are disposed (as shown) in two columns, although three or more columns may be provided.

The rotatable shredder assembly 800 is provided with a vertically-movable protective cover 265.

The third sub-assembly 27 consists of drive means 300 at the downstream end 301 of the sturdy base table 12. These drive means 300 include a suitable preferably electric, motor 302 which is provided with a shaft 303 to which a drive pulley 304 is secured. The longitudinally-extending driven shaft 305 is mounted on suitable bearings 306. The downstream end of the driven shaft 305 is provided with a driven pulley 310 which is entrained by a drive belt 311, which also entrains the drive pulley 304. As noted hereinabove, the upstream end of the driven pulley 305 is secured to the shredder wheel/shredder disc assembly 900. The electric motor 302 is provided with a semi-cylindrical protective cover.

Finally, a control box 350 is secured to the forward end of the sturdy base table 12, the control cables 350 thereof being enclosed within two conductor rods 351.

Also secured to the main frame 12 are two additional frame members to support a primary cheese conveying system 500 and a secondary cheese loading system 600.

Primary cheese conveying system 500 (see FIG. 1 and FIG. 3) includes a frame 501 which is constituted by a pair of transversely-spaced apart, longitudinally-extending rails 502, are supported by legs 503, each of which are provided with a wheel 504. The rails 502 support an upstream roller 505 and a downstream roller 506. Each of the rollers 505, 506 include a central depression 507 within which a drive belt 508 may be disposed so that it entrains the rollers 505,506, to drive these rollers. Suitable means (not seen) which are well-known to those skilled in the art, are used to drive these drive belt 508. A conveyor belt 509 entrains the rollers 505,506. In addition, drive belt 509 includes the usual tension controlling rollers, suitably disposed below the frame 501 (not seen). A suitable means temporarily to stop the movement of the conveyor belt, e.g., a reed switch 510, is provided at the downstream end of the conveying system 500.

The secondary cheese loading system 600 (see FIG. 1, FIG. 2 and FIG. 3) cooperates with the cheese conveying system 500. Such secondary cheese loader system 600 includes a hydraulic cylinder 601 which is disposed within a transversely extending rectangular parallelepiped box 602. Hydraulic cylinder 601 includes a piston 603 and a piston rod 604. A cheese-pushing plate 605 is secured to the free end of the piston rod 604. The secondary cheese loading system 600 is secured to the downstream end 511 of the primary conveying system 500. In addition, the cheese-pushing plate 605 is aligned with the open face 204 of the elongated cheese chamber 201.

METHOD OF OPERATION IN RELATION TO FIG. 3

Turning now to a description of the method of this invention involving the use of the apparatus, which is schematically illustrated in FIG. 3, the first step of the method involves loading the cheese block 1200 into the interior of the cheese chamber 201. This is accomplished by placing one or more blocks of cheese 1200 on the primary cheese conveyor system 500 and initiating downstream movement of the primary cheese conveyor 509. When the block of cheese is aligned with the open side face 204 of the cheese chamber 201, the cheese block 1200 engages a suitable stop means, namely a reed switch (510) which stops the movement of the conveyor 509.

When there is no further remnants of the block of cheese 1200 in the cheese chamber 201, the cheese loading system 600 is activated to cause the piston rod 604, with the cheese-engaging block 605 at the end thereof to abut the block of cheese 1200 which is stationary on the primary conveyor 509 and urges it into the cheese chamber 201.

Entry of the cheese block 1200 into the cheese chamber 201 causes the primary ram assembly 28 to start. This may be accomplished by means which are well-known to those skilled in the art, e.g., by the use of reed switches 510. The rod end 31 of the primary pneumatic/hydraulic cylinder 29, which is fitted with a cheese-pushing block 40 is urged into the cheese chamber 201 and abuts the cheese block 1200 and urges it through the extrusion grid plate 205. The extruded smaller cheese so formed are immediately engaged by the cheese shredder disc 1101 of the rotatable shredder assembly 500 which is rotated by motor 302. The cheese shreds fall through an outlet slot to be captured by conventional means, e.g., a conveyor which may convey the shredded cheese to a storage area.

This operation is carried out in an intermittently/continuous manner, the feeding of the cheese blocks into the cheese chamber being interrupted only by the length of time it takes completely to shred the standard block of cheese, e.g., about 5 seconds. This system is designed to shred approximately 1200 lbs of cheese/hour.

In narrative form, the operation as described above in FIG. 3 may be summarized as follows:

In operation, blocks of cheese are manually or automatically placed on the primary conveyor. The primary conveyor transports the block of cheese to an intake position of the cheese chamber. The intake position is bounded by a transversely-extending backstop of the cheese loading ram.

Suitable means are provided so that when a block of cheese impacts the backstop, the cheese loading ram is activated to urge the block of cheese through the open side face of the cheese chamber, but only if suitable means indicate that the extruding ram is in the start position.

The cheese loading ram, namely a hydraulic actuator or any other suitable type of actuator, causes the ram to force the block of cheese laterally across the plane of the primary conveyor and into the cheese chamber.

The extruding ram is a pneumatic/hydraulic cylinder and as disposed parallel to the transporting conveyor. The cylinder includes an internal piston connected to an external piston rod. Within the cylinder, air under pressure is in contact with the upstream face of the piston, and the downstream end of the cylinder is filled with hydraulic fluid. The free end of the piston rod is provided with a removable cheese-pushing plate which is made of synthetic plastic material, and of a dimension conforming to the cross-section of the cheese chamber. The cheese-pushing plate is removable for cleaning purposes. The cheese pushing plate is also connected to an upper pusher plate slidable on pusher rods to assist in the pushing of the block of cheese.

To initiate the power stroke air under pressure is admitted to the upstream end of the cylinder to urge the piston downstream, while simultaneously forcing air into the reservoir through a single line. Conversely, to initiate the return stroke, air under pressure is admitted to the reservoir, which forces oil into the downstream end of the cylinder through the return lines.

The cheese chamber is provided with suitable means to cause the initiation of the powers stroke and return. The return movement of the piston is controlled and maintained by suitable means, e.g., the plurality of micro switches in the cheese shredding piston chamber.

The conveyor is driven by a motor, which causes a drive roller to rotate. A conveyor belt entrains the drive roller and a driver roller, and includes a tensioning roller below the return loop of the conveyor belt.

Because the shredder disc is secured within the shredder wheel, and because the shredder wheel is secured within the flanges at the end of the cheese chamber, the risk of shredded cheese "leaking" out is greatly minimized.

It is desirable that the friction exerted on the cheese at the knife edges in the extrusion grid plate as the cheese passes there through be sufficient to enable pressure to be generated within the chambers by the ram assembly so that the block of cheese may be extruded. However, the development of excessive pressure on the cheese within the chamber poses difficulties in the development of extrusion apparatus for forming cheese shreds. The present invention provides apparatus for forming a block of cheese into a plurality of approximately-uniform, relatively-small shreds of predetermined configuration without substantial damage to the cheese. This is achieved by the use of pneumatic/hydraulic cylinders.

From the foregoing, it will be appreciated that the present invention provides a novel and improved apparatus and method for producing cheese shreds, which enables blocks of cheese to be formed into relatively small, relatively uniform shreds which are acceptable for consumer sale. The apparatus has various features to minimize damage to the cheese during operation.

CONCLUSION

From the foregoing, it will be appreciated that the present invention provides a novel and improved apparatus and method for producing cheese shreds, which enables blocks of cheese to be formed into relatively small, relatively uniform shreds which are acceptable for consumer sale. The apparatus has various features to minimize damage to the cheese during operation.

What is claimed is:

1. An improvement in an apparatus for forming a block of cheese into a plurality of relatively small shreds, said apparatus including an elongated cheese chamber having longitudinally-extending side and floor surfaces for slidingly-engaging said block of cheese, an extrusion grid plate at the downstream end of said elongated cheese chamber, and ram means for forcing said block of cheese in a downstream direction at a predetermined speed through said extrusion grid plate, the improvement comprising: a rotatable shredder assembly sited immediately downstream of, and in longitudinal abutment with, said extrusion grid plate, said extrusion grid plate terminating in a flanged disc having a central, longitudinally-extending hollow hub, said rotatable shredder assembly comprising the combination of a shredder disc support wheel which is secured to a shaft which is external to said elongated cheese chamber and which is rotatably disposed within said longitudinally-extending hollow hub downstream at said extrusion grid plate, said shredder disc support wheel including a plurality of circumferentially-spaced-apart tabs which project downwardly from the periphery thereof and are spaced from a front face of said shredder disc support wheel, and a shredder disc of essentially the same diameter as said shredder disc support wheel having a like plurality of flat circumferential areas, whereby said shredder disc is removably secured to said shredder disc support wheel by placing said shredder disc wheel on said front face of said shredder disc support wheel and rotating said shredder disc until said flat circumferential areas are locked behind said tabs, rotation of said combined shredder disc support wheel/shredder disc serving to shred each of said extruded cheese pieces as they emerge from said extrusion grid plate to divide said extruded cheese pieces into a plurality of discrete shreds.

2. The apparatus as claimed in claim 1 wherein said extrusion grid plate defines a plurality of parallel, horizontal and parallel vertical knife edges constituting a plurality of rectangular parallel openings.

3. Apparatus as claimed in claim 1, including a primary belt conveyor system to convey said block of cheese to an open side face of said cheese chamber, and a stop device to stop said block of cheese at said open side face of said cheese chamber.

4. The apparatus as claimed in claim 3, also including a second ram system, which is disposed at right angles to said elongated cheese chamber and which is actuated upon detecting the absence of cheese in said elongated cheese chamber to push a block of cheese, which has been stopped on said belt conveyor, into said elongated cheese chamber through said open side face thereof.

5. An improvement in an apparatus for forming a block of cheese into a plurality of relatively small shreds, said apparatus including an elongated cheese chamber having longitudinally-extending side and floor surfaces for slidingly-engaging said block of cheese, an extrusion grid plate at the downstream end of said elongated cheese chamber, and ram means for forcing said block of cheese in a downstream direction at a predetermined speed through said extrusion grid plate, the improvement comprising both:

(i) a rotatable shredder assembly sited immediately downstream of, and in longitudinal abutment with, said extrusion grid plate, said extrusion grid plate terminating in a flanged disc having a central longitudinally-extending hollow hub, said rotatable shredder assembly comprising the combination of a shredder disc support wheel which is secured to a shaft which is external to said elongated cheese chamber and which is rotatably disposed within said longitudinally-extending hollow hub downstream of said extrusion grid plate, said shredder disc support wheel including a plurality of circumferentially-spaced-apart tabs which project downwardly from the periphery thereof and are spaced from a front face of said shredder disc support wheel, and a shredder disc of essentially the same diameter as said shredder disc support wheel having a like plurality of flat circumferential areas, whereby said shredder disc is removably secured to said shredder disc support wheel by placing said shredder disc wheel on said front face of said shredder disc support wheel and rotating said shredder disc until said flat circumferential areas are locked behind said tabs, rotation of said combined shredder disc support wheel/shredder disc serving to shred each of said extruded cheese pieces as they emerge from said extrusion grid plate to divide said extruded cheese pieces into a plurality of discrete shreds; and (ii) said ram means comprising a combined, unitary hydraulic/pneumatic cylinder, including an upstream air chamber and a downstream hydraulic chamber in the same cylinder, divided by a piston having a downstream extending piston rod which is connected to a cheese pusher plate assembly, a connection from a source of air under pressure to said upstream air chamber to initiate a power pressure stroke, a hydraulic connection between said hydraulic chamber and a hydraulic reservoir, and a source of air under pressure to said downstream hydraulic chamber to urge said hydraulic fluid from said downstream hydraulic chamber into said hydraulic reservoir in a power return stroke.

6. The apparatus as claimed in claim 5 wherein said extrusion grid plate defines a plurality of parallel, horizontal and parallel vertical knife edges constituting a plurality of rectangular parallel openings.

7. An improvement in an apparatus for forming a block of cheese into a plurality of relatively small shreds, said apparatus including: an elongated cheese chamber having longitudinally-extending side and floor surfaces for slidingly-engaging said block of cheese, an extrusion grid plate at the downstream end of said elongated cheese chamber, and ram means for forcing said block of cheese in a downstream direction at a predetermined speed through said extrusion grid plate, the improvement wherein said ram means comprises a combined unitary hydraulic/pneumatic cylinder, including an upstream air chamber and a downstream hydraulic chamber in the same cylinder, divided by a piston having a downstream extending piston rod which is connected to a cheese pusher plate assembly, a connection from a source of air under pressure to said upstream air chamber to initiate a power pressure stroke, a hydraulic connection between said hydraulic chamber and a hydraulic reservoir, and a source of air under pressure to said downstream hydraulic chamber to urge said hydraulic fluid from said downstream hydraulic chamber into said hydraulic reservoir in a power return stroke.

8. The apparatus as claimed in claim 7, wherein said hydraulic reservoir includes a one-way check-valved air outlet.

9. The apparatus as claimed in claim 7, wherein the hydraulic connection between said hydraulic chamber and said hydraulic reservoir comprises a two way hydraulic line to, and from, said hydraulic reservoir, which is provided with a manually-controllable flow valve, and a one-way-check-valved hydraulic line from said hydraulic reservoir.

* * * * *